(12) United States Patent
Zeng et al.

(10) Patent No.: US 8,686,850 B2
(45) Date of Patent: Apr. 1, 2014

(54) WIRELESS EARTHQUAKE ALARM BASED ON MEMS ACCELEROMETERS

(75) Inventors: Tao Zeng, Beijing (CN); Bing Zhang, Beijing (CN); Huayin Zheng, Beijing (CN); Jianzhong Deng, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 425 days.

(21) Appl. No.: 12/707,496

(22) Filed: Feb. 17, 2010

(65) Prior Publication Data

US 2011/0037588 A1 Feb. 17, 2011

(30) Foreign Application Priority Data

Aug. 11, 2009 (CN) ............. 2009 1 0164862

(51) Int. Cl.
*G08B 21/00* (2006.01)
(52) U.S. Cl.
USPC ............ 340/539.1; 340/690; 367/344
(58) Field of Classification Search
USPC .......... 340/539.26, 690, 286.02; 73/382 R, 73/570; 166/250.1; 367/344, 31, 21
See application file for complete search history.

(56) References Cited

U.S. PATENT DOCUMENTS

| | | | | |
|---|---|---|---|---|
| 3,717,036 A | * | 2/1973 | LaCoste | ............ 73/382 R |
| 4,297,690 A | | 10/1981 | Baker | |
| 5,418,523 A | | 5/1995 | Anderson et al. | |
| 5,524,709 A | * | 6/1996 | Withers | ............ 166/250.1 |
| 5,910,763 A | * | 6/1999 | Flanagan | ............ 340/286.02 |
| 6,084,525 A | * | 7/2000 | Toyota et al. | ............ 340/690 |
| 6,118,368 A | | 9/2000 | Rohm | |
| 6,118,386 A | * | 9/2000 | Yousif | ............ 340/690 |
| 6,356,204 B1 | * | 3/2002 | Guindi et al. | ............ 340/690 |
| 6,392,538 B1 | * | 5/2002 | Shere | ............ 340/539.26 |
| 7,463,162 B1 | | 12/2008 | Hosseini | |
| 7,518,949 B2 | * | 4/2009 | Haugland | ............ 367/31 |
| 2002/0021130 A1 | * | 2/2002 | Park | ............ 324/344 |
| 2004/0263338 A1 | | 12/2004 | Katz | |

(Continued)

FOREIGN PATENT DOCUMENTS

| | | |
|---|---|---|
| CN | 1126939 C | 11/2003 |
| CN | 1867839 A | 11/2006 |

(Continued)

OTHER PUBLICATIONS

International Search Report and Written Opinion for International Application No. PCT/CN2010/072757 mailed on Aug. 19, 2010.

*Primary Examiner* — Steven Lim
*Assistant Examiner* — Kaleria Knox
(74) *Attorney, Agent, or Firm* — Brundidge & Stanger, P.C.

(57) ABSTRACT

The disclosure relates to detecting seismic movements and providing at least one alarm notification based on the detected seismic movement. Particularly, a sensor device, which may be positioned in a subterranean part of a structure, may detect a seismic movement. The sensor device may make a determination as to whether the received seismic movement is greater than a predetermined threshold. If the seismic movement is greater than a predetermined threshold, the sensor device may transmit an alarm notification to one or more alarm devices, which may be located within the structure, indicating the seismic movement. The alarm device(s) may provide an alarm, notifying people in the structure of the seismic movement. This may provide an opportunity for the people to leave the structure before the seismic movement reaches the structure.

14 Claims, 6 Drawing Sheets

(56) References Cited

U.S. PATENT DOCUMENTS

| | | | |
|---|---|---|---|
| 2006/0248954 A1* | 11/2006 | Snieder | 73/570 |
| 2007/0033153 A1 | 2/2007 | Yamanaka et al. | |
| 2008/0144435 A1* | 6/2008 | Morley | 367/21 |

FOREIGN PATENT DOCUMENTS

| | | |
|---|---|---|
| CN | 101339253 A | 1/2009 |
| CN | 201210339 Y | 3/2009 |
| CN | 101587626 A | 11/2009 |
| JP | 8285673 A | 11/1996 |
| JP | 2000214267 A | 8/2000 |
| JP | 2001-147272 A | 5/2001 |
| JP | 200240155 A | 2/2002 |
| JP | U3119236 A | 1/2006 |
| JP | 2006-234480 A | 9/2006 |
| JP | 2006284339 A | 10/2006 |
| JP | 2007-263863 A | 10/2007 |
| JP | 2008-298499 A | 12/2008 |

* cited by examiner

WIRELESS EARTHQUAKE ALARM BASED ON MEMS ACCELEROMETERS

BACKGROUND

Large magnitude earthquakes may cause significant losses of life and property. Conventional earthquake detection devices and systems utilize a vibrometer in a magnetic-electric sensor, or pick-up unit. These devices and systems may involve complicated circuitry and may be expensive.

SUMMARY

A method is described in the present disclosure which includes detecting, at an accelerometer, a longitudinal wave of a seismic movement; determining whether a magnitude of the longitudinal wave exceeds a predetermined threshold; and wirelessly transmitting an alarm notification indicating seismic movement to at least one alarm device.

The method may further include providing the accelerometer in a subterranean position of a building; and providing the alarm device in the building.

The method may further include detecting, at the accelerometer, a shear wave of the seismic movement; determining whether a magnitude of the shear wave is greater than a predetermined threshold; and wirelessly transmitting an alarm notification indicating seismic movement to the at least one alarm device.

The method may further include generating an alarm based on the determination that the magnitude of the longitudinal wave is greater than the predetermined threshold.

Alternatively, the present disclosure provides an apparatus including a detecting unit including an accelerometer configured to detect seismic movements; a determining unit configured to determine whether a magnitude of a detected seismic movement is greater than a predetermined threshold; and a communication unit configured to transmit an alarm notification indicating seismic movement to at least one alarm device when the determining unit determines the magnitude of the detected seismic movement is greater than the predetermined threshold.

The apparatus may further provide wherein the accelerometer detects a longitudinal wave of the seismic movement the determining unit determines whether the magnitude of the detected seismic movement is greater than a predetermined threshold based on the detected longitudinal wave.

The apparatus may further provide wherein the accelerometer detects a shear wave of the seismic movement the determining unit determines whether the magnitude of the detected seismic movement is greater than a predetermined threshold based on the detected shear wave.

The apparatus may further provide wherein the apparatus is configured to operate in a subterranean position of a building.

The apparatus may further include a rotatable rack holding at least the accelerometer, wherein the rack is configured to rotate to locate the direction of the gravity acceleration.

The apparatus may further include an amplifier for amplifying the signal for transmission by the communication unit.

The apparatus may further include a rechargeable power supply.

The apparatus may further include at least one speaker for emitting an auditory alarm when the determining unit determines that the magnitude of the detected seismic movement is greater than a predetermined threshold.

Alternatively, the present disclosure provides a method including receiving an alarm notification from a remote device including an accelerometer, the alarm notification including an indication of a seismic movement; and providing at least one of an auditory alarm and a visual alarm based on the received alarm notification.

The method may further include transmitting another alarm notification to a remote alarm device based on the received alarm notification.

The method may further provide wherein transmitting another alarm notification includes transmitting another alarm notification to the remote alarm device based on the received alarm notification wirelessly.

Alternatively, the present disclosure may provide an apparatus including a communication unit configured to receive, from a remote device including an accelerometer, an alarm notification indicating seismic movement from the remote device; and an alarm unit configured to provide at least one of an auditory alarm and a visual alarm based on the received alarm notification.

The apparatus may further provide wherein the communicating unit is further configured to transmit another alarm notification to a remote alarm device based on the received alarm notification.

The apparatus may further provide wherein the communication unit transmits the another alarm notification to the remote alarm device based on the received alarm notification wirelessly.

According to the present disclosure, the aforementioned method, or any part thereof, may be performed by a computing device under the direction of a computer program embodied on a computer readable medium.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
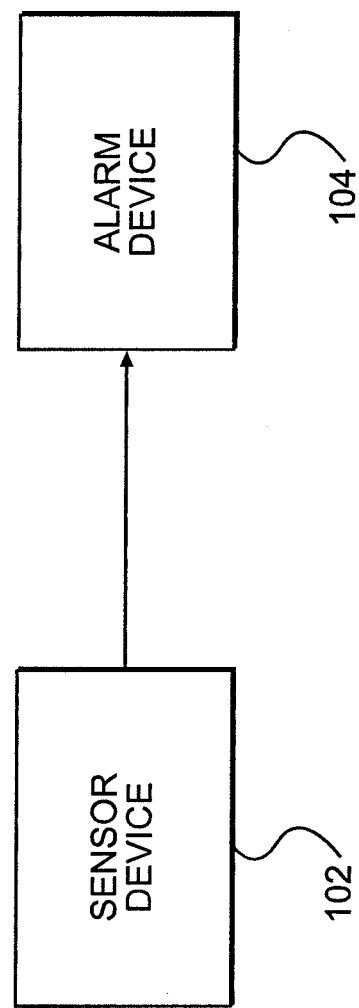
FIG. 1 is a block diagram illustrating a system environment arranged to detect a seismic movement and provide an alarm, according to an example embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses, computer programs and systems related to detecting seismic movements and providing at least one alarm notification based on the detected seismic movement. Particularly, a sensor device, which may be positioned in a subterranean part of a structure, may detect a seismic movement. The sensor device may make a determination as to whether the received seismic movement is greater than a predetermined threshold. If the seismic movement is greater than a predetermined threshold, the sensor device may transmit an alarm notification to one or more alarm devices, which may be located within the structure, indicating the seismic movement. The alarm device(s) may provide an alarm, notifying people in the structure of the seismic movement. This may provide an opportunity for the people to leave the structure before the seismic movement reaches the structure.

FIG. 1 is a block diagram illustrating a system 100 arranged to detect a seismic movement and transmit an alarm notification to an alarm device.

As shown in FIG. 1, the system 100 may include a sensor device 102 and an alarm device 104. It may be appreciated by one skilled in the art that although only one sensor device and one alarm device are depicted in system 100, multiple sensor devices and/or alarm units may be provided in system 100. It may further be appreciated that at least one sensor device 102 may communicate with multiple alarm devices, and/or one alarm device may communication with multiple sensor devices.

The sensor device 102 may be installed in a subterranean position within a structure, for example, a building. Alarm device 104 may further be installed in the same structure as sensor device 102 or may be installed in a different structure. Alternatively, sensor device 102 may communicate with more than one alarm device installed in the same structure the sensor device 102 is installed. Alternatively, sensor device 102 may communicate with alarm device(s) installed in a different structure.

Sensor device 102 may communicate with alarm device 104 through, for example, radio frequency or other wireless media.

Figure 2:
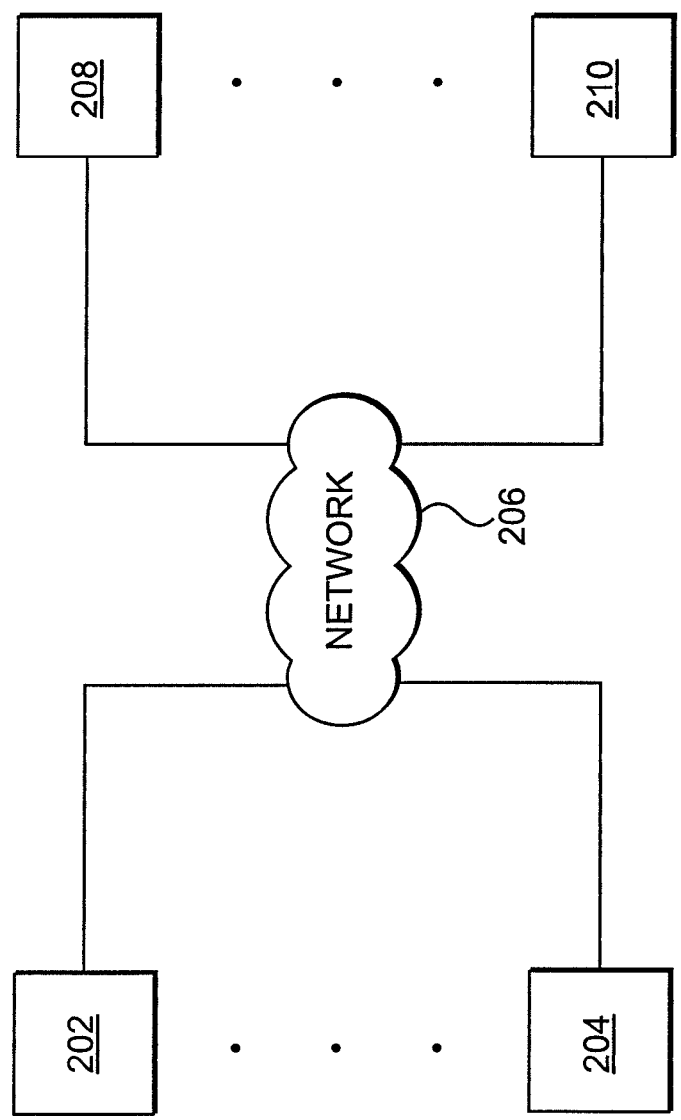
FIG. 2 illustrates an alternative environment to detect a seismic movement and provide an alarm, according to an example embodiment.

FIG. 2 illustrates an alternative environment providing system 200 which is arranged to detect a seismic movement and transmit at least one alarm notification to at least alarm device.

As shown in FIG. 2, sensor devices 202, 204 are communicably linked to network 206. Sensor devices 202, 204 may communicate with one or more of alarm devices 208, 210. While only two sensor devices are depicted, it may be appreciated that more than two sensor devices may reside in system 200. Further, while only two alarm devices are depicted, more than two alarm devices may reside in system 200. In addition, one or more alarm devices 208, 210 may communicate with other alarm devices residing within system 200.

The sensor device 202, 204 may be installed in a subterranean position within a structure, for example, a building. At least one of alarm device 208, 210 may be installed in the same structure as sensor device 202 or 204 or may be installed in a different structure. Alternatively, sensor device 202, 204 may communicate with more than one alarm device installed in the same structure the sensor device 202, 204 is installed. Alternatively, sensor device 102 may communicate with alarm device(s) installed in a different structure.

Sensor device 202, 204 may operate in a networked environment through network 106 which may be implemented as, for example, a local area network, a wide area network, etc.

When used in a LAN networking environment, sensor device 202, 204 may be connected to the local network 206 through a network interface or adapter at sensor device 202, 204. When used in a wide area networking environment, sensor device 202, 204, may include a modem or other means for establishing a communications link over the wide area network 106, e.g., to the Internet. The modem, which may be internal or external, may be connected to a system bus via a serial port interface. In a networked environment, program modules in sensor device 202, 204 may be stored in a local memory storage device. Of course, it will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit sensor device 202, 204 to transmit alarm notifications to alarm device 208, 210.

Figure 3:
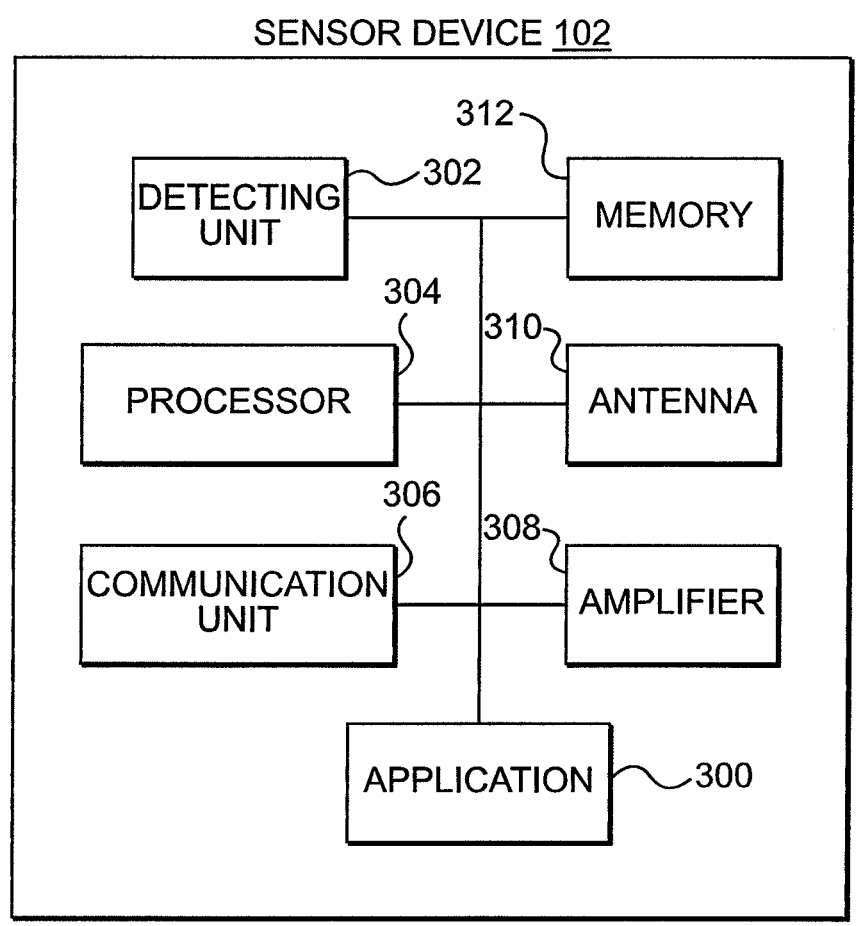
FIG. 3 is a block diagram illustrating an example of a configuration of a sensor device, according to an example embodiment.

FIG. 3 depicts an example block diagram of sensor device 102. It may be appreciated that sensor device 202, 204 may include similar components as sensor device 102.

Sensor device may include application 300. Application 300 may be implemented as software, firmware, and/or hardware, or a combination thereof to achieve the functionality of sensor device 102 as discussed herein.

Sensor device 102 may include a detecting unit 302. Detecting unit 302 may be implemented including an accelerometer, for example, a three axis accelerometer, for example, Freescale, three-axis accelerometer MMA7600QT. It may be appreciated that other accelerometers may be implemented.

It may further be appreciated that the use of an accelerometer may provide a small, low cost device with simple processing circuitry.

Sensor device 102 may further include processor 304 (determining unit) and may be implemented as a single-chip processor, for example, C8051F330 from Silicon Labs, having a speed of 25MIPS with 8K FLASH, 768RAM, 17-pin with an ADC chip of 10 bits and 200 Ksps.

Detecting unit 302 may be configured to detect one or more longitudinal waves (P waves) of a seismic movement, such as an earthquake. Detecting unit 302 may further, or alternatively, be configured to detect one or more shear waves (S waves) of a seismic movement, such as an earthquake.

Sensor device 102 may include communication unit 306. Communication unit 306 may be implemented including a wireless chip, for example, TI CC1100 wireless chip having a small size, high sensitivity, multi-frequency band, programmable data transfer rate, low current consumption, programmable control of output power and optional staggered forward error correction. Communication unit 306 may be configured to facilitate communication between sensor device 102 and one or more alarm devices.

It may be appreciated that wireless transmission may provide a convenient solution from using standard telephone lines. Wireless transmission may further provide a reliable, low cost communication method.

Sensor device 102 may further include amplifier 308. Amplifier may be implemented to amplify an alarm notification for transmission to an alarm device. Sensor device 102 may further include antenna 310.

Sensor device 102 may further include memory 312. Memory 312 may store information relating to predetermined thresholds of magnitudes of longitudinal waves and/or shear waves. For example, if a magnitude of a longitudinal wave is greater than a stored predetermined value, this may indicate an earthquake that is capable of damaging a structure.

Sensor device 102 may alternatively include an alarm unit (not depicted) to provide an alarm at the sensor device. The alarm unit may be implemented to include one or more speaker modules, for example, an audio chip, for example, KD9561, and electrical speakers.

Sensor device 102 may include a power supply module (not depicted), for example, a power supply, a rechargeable battery and a 7805 block component regulator. The power supply may convert 22V into DC voltage of 9V. The rechargeable battery may supply power during a power loss. Sensor device 102 may further include a power supply module from AIC Corporation, AR33 chip with a 3.3V power supply.

Sensor device 102 may further include a tuning module (not depicted). The tuning module may have a self-locking button and a green light-emitting diode component. When the self-locking button is connected, the LED glows green, indicating that the single-chip is measuring the gravity acceleration. When the self-locking button is not pushed, the diode does not glow, indicating that a seismic acceleration measurement program in detecting unit 302 is running.

Sensor device 102 may be provided in a rotatable rack. The rotatable rack may hold, or house, at least the accelerometer. The rack may be configured to rotate in order to locate the direction of gravity acceleration.

As noted above, sensor device 202, 204 may include components as discussed with regard to sensor device 102. In addition, sensor device 202, 204 may include additional, hardware, firmware and/or software in order to communicate over network 106, as is appreciated by one skilled in the art.

Figure 4:
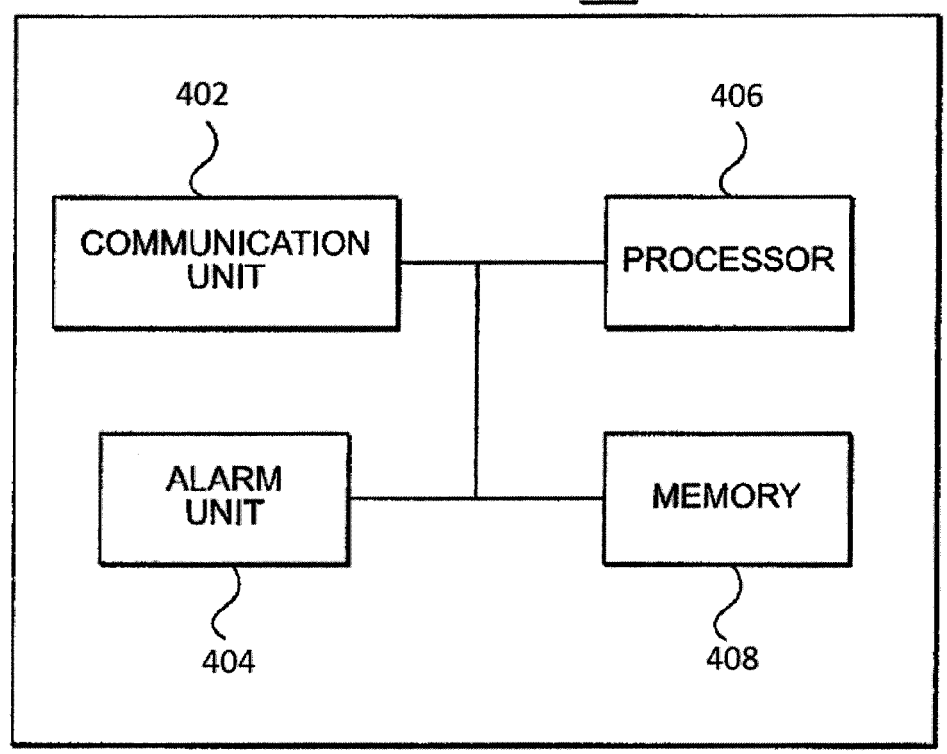
FIG. 4 is a block diagram illustrating an example of a configuration of an alarm device, according to an example embodiment.

FIG. 4 depicts an example block diagram of an alarm device 104. It may be appreciated that alarm device 208, 210 may include similar components as alarm device 104.

As shown in FIG. 4, alarm device 104 may include communication unit 402. Communication unit 402 may be implemented including a wireless chip, for example, TI CC1100 wireless chip having a small size, high sensitivity, multi-frequency band, programmable data transfer rate, low current consumption, programmable control of output power and optional staggered forward error correction. Communication unit 402 may be configured to facilitate communication between alarm device 104 and one or more sensor devices 104 and/or alarm devices.

Alarm device 104 may further include alarm unit 404. The alarm unit may be implemented to include one or more speaker modules, for example, an audio chip, for example, KD9561, and electrical speakers. Alternatively, or in addition, alarm unit may include a light alarm that flashes light.

Alarm device 104 may further include processor 406 and may be implemented as a single-chip processor, for example, C8051F330 from Silicon Labs, having a speed of 25MIPS with 8K FLASH, 768RAM, 17-pin with an ADC chip of 10 bits and 200 Ksps.

Alarm device 104 may further include an amplifier. Amplifier may be implemented to amplify an alarm notification for transmission to an alarm device.

Alarm device 104 may further include memory 408. Memory 408 may store information relating to generating and transmitting alarm notifications as is appreciated by one skilled in the art.

Alarm device 104 may include a power supply module (not depicted), for example, a power supply, a rechargeable battery and a 7805 block component regulator. The power supply may convert 22V into DC voltage of 9V. The rechargeable battery may supply power during a power loss. Sensor device 102 may further include a power supply module from AIC Corporation, AR33 chip with a 3.3V power supply.

Alarm device 104 may include an application module (not depicted) that may be implemented as software, firmware, and/or hardware, or a combination thereof to achieve the functionality of alarm device 104 as discussed herein.

As noted above, alarm device 208, 210 may include components as discussed with regard to alarm device 104. In addition, alarm device 208, 210 may include additional, hardware, firmware and/or software in order to communicate over network 106, as is appreciated by one skilled in the art.

Figure 5:
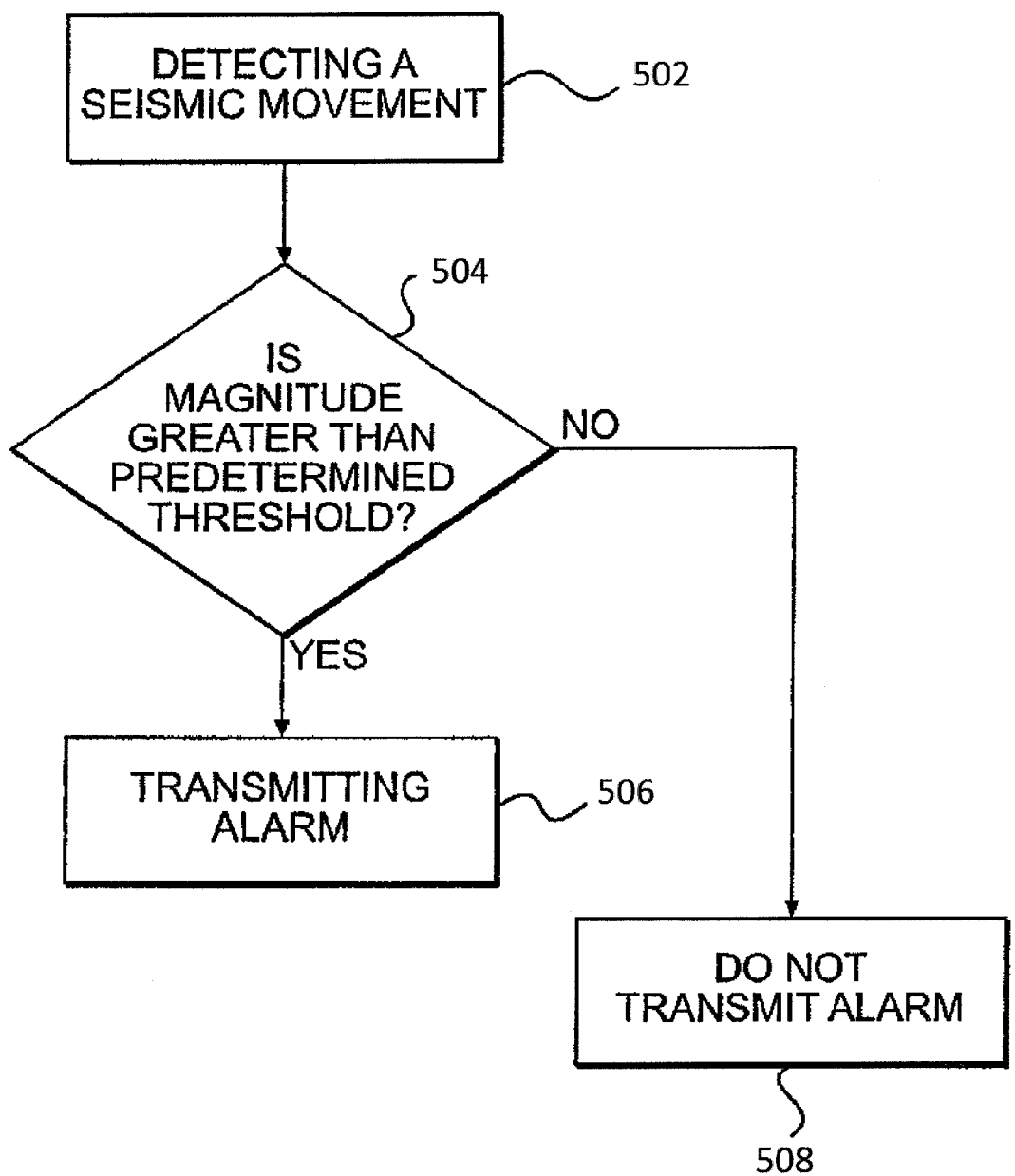
FIG. 5 is a flow diagram illustrating an example of a method for detecting a seismic movement and transmitting an alarm notification, according to an example embodiment.

FIG. 5 depicts a flow diagram of an example of a method for detecting a seismic movement and transmitting an alarm notification. As shown in FIG. 5, sensor device 102 detects a seismic movement (Step 502). Detecting unit 302 detects a longitudinal wave and/or a shear wave of a seismic movement. This may be detected via an accelerometer.

Detecting unit 302 may then communicate the detected wave to a processor 304. Processor 304, running application 300, may access information stored in memory 312 to determine whether the wave exceeds a predetermined threshold (Step 504). If the wave exceeds a predetermined threshold (Step 504, Yes), processor 304 instructs communication unit to transmit an alarm notification to an alarm device (Step 506). The alarm notification may be transmitted to one or more alarm devices, either in the same structure that the sensor device is located in, or in one or more different structures that the sensor device is located in. If the wave does not exceed a predetermined threshold (Step 504, No), the sensor device 102 may not transmit an alarm.

If it is determined that the detected wave is greater than a predetermined threshold, an alarm unit at the sensor device may provide an alarm, such as a light and/or an auditory alarm. This may be perceived by people in the vicinity of the sensor device that they should leave the structure.

It may be appreciated that more that one longitudinal wave may be detected. One or more of the magnitudes of the detected longitudinal waves may be compared with a predetermined threshold. An alarm notification may be sent if at least one of the magnitudes of the detected waves exceeds a predetermined threshold. Alternatively, an alarm may be generated only if all of the magnitudes of the detected waves exceed the predetermined threshold.

It may be appreciated that more that one shear wave may be detected. One or more of the magnitudes of the detected shear waves may be compared with a predetermined threshold. An alarm notification may be sent if at least one of the magnitudes of the detected waves exceeds a predetermined threshold. Alternatively, an alarm may be generated only if all of the magnitudes of the detected waves exceed the predetermined threshold.

Figure 6:
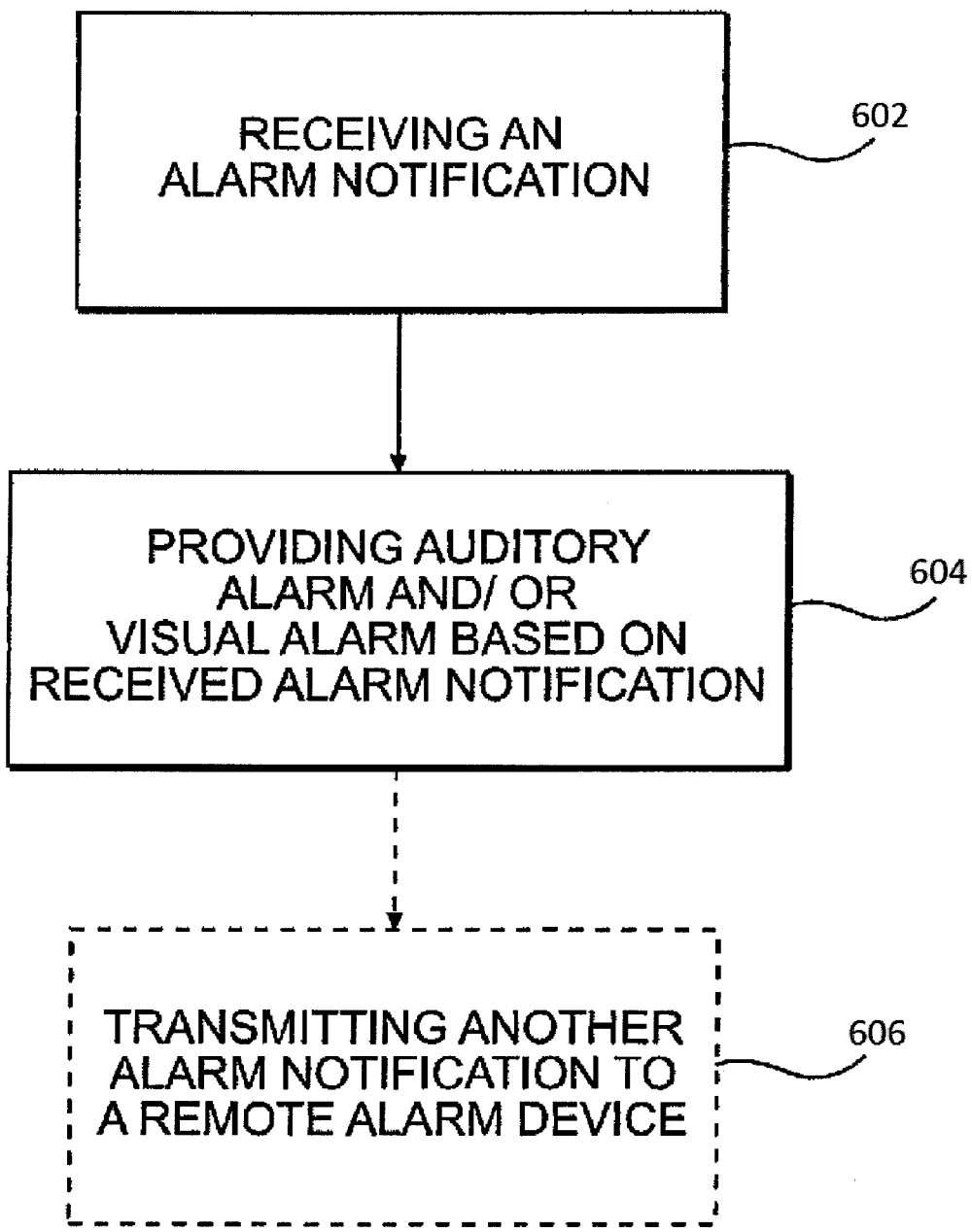
FIG. 6 is a flow diagram illustrating an example of a method for receiving an alarm notification and generating an alarm, according to an example embodiment.

FIG. 6 depicts a flow diagram of an example of a method for providing alarm based on a received alarm notification. As shown in FIG. 6, alarm device 104 receives an alarm notification indicating seismic movement (Step 602). The alarm notification may be received from sensor device 102, or from another alarm device. Alarm device 104 may then provide an alarm based on the received alarm notification (Step 604). For example, alarm device 104 may provide an auditory alarm through, for example, speaker at alarm unit 404. In addition, or alternatively, alarm device 104 may provide a visual alarm, for example, by flashing a light at alarm unit 404. The visual and/or auditory alarm may be perceived by people in the vicinity of the alarm device that they should leave the structure.

Alternatively, alarm device 104 may generate and transmit another alarm notification to another alarm device, for example, in system 200 (Step 606). This alarm notification may be transmitted from alarm device 104 based on the alarm notification received from sensor device 102.

It may be appreciated that the functionality as discussed with regard to sensor device 102 may be ascribed to sensor device 202, 204 as shown in FIG. 2. It may further be appreciated that the functionality as discussed with regard to alarm device 104 may be ascribed to alarm device 208, 210 as shown in FIG. 2.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    detecting, by a device that includes an accelerometer disposed in a subterranean position of a building, a plurality of longitudinal waves of a seismic movement;
    locally determining, by the device, whether each of a plurality of magnitudes of a particular longitudinal wave of the plurality of longitudinal waves of the seismic movement exceeds a particular threshold for longitudinal waves; and
    wirelessly transmitting, from the device via a networked connection, an alarm notification indicating seismic movement to at least one alarm device in the building, in response to the each of the plurality of magnitudes of the particular longitudinal wave exceeding the particular threshold for longitudinal waves.

2. A method comprising:
    detecting a plurality of shear waves of a seismic movement;
    locally determining, by at least one alarm device that includes an accelerometer, whether each of a plurality of magnitudes of a particular shear wave of the plurality of shear waves of the seismic movement exceeds a particular threshold for shear waves; and
    wirelessly transmitting, via a networked connection, an alarm notification indicating seismic movement to the at least one alarm device, in response to the each of the plurality of magnitudes of the particular shear wave exceeding the particular threshold for shear waves.

3. An apparatus, comprising:
    a detection unit including an accelerometer that is configured to be installed in a subterranean position within a structure and configured to detect a plurality of longitudinal waves of a seismic movement;
    a determination unit configured to determine whether each of a plurality of magnitudes of a particular longitudinal wave of the plurality of longitudinal waves of the seismic movement is greater than a particular threshold for longitudinal waves; and
    a communication unit configured to wirelessly transmit, via a networked connection, an alarm notification indicating seismic movement to at least one alarm device that is configured to be installed in the structure in response to a determination by the determination unit that the each of the plurality of magnitudes of the particular longitudinal wave is greater than the particular threshold for longitudinal waves.

4. The apparatus of claim 3, wherein the accelerometer is further configured to detect a shear wave of a plurality of shear waves of the seismic movement and the determination unit is further configured to determine whether magnitudes of the shear wave is greater than a particular threshold for shear waves.

5. The apparatus of claim 3, further comprising a rotatable rack configured to hold at least the accelerometer, wherein the rotatable rack is configured to rotate to locate a direction of a gravity acceleration.

6. The apparatus of claim 3, further comprising an amplifier configured to amplify a signal having the alarm notification for transmission by the communication unit.

7. The apparatus of claim 6, further comprising a rechargeable power supply.

8. The apparatus of claim 6, further comprising at least one speaker configured to emit an auditory alarm in response to the determination by the determination unit that the each of the plurality of magnitudes of the particular longitudinal wave is greater than the particular threshold for longitudinal waves.

9. A method, comprising:
    receiving, via a wireless networked connection, an alarm notification from a remote device including an accelerometer installed in a subterranean position within a structure,
        wherein the alarm notification includes a determination that each of a plurality of magnitudes of a particular longitudinal wave of a seismic movement exceeds a particular threshold for longitudinal waves indicating the seismic movement at the remote device; and
    initiating at least one of an auditory alarm and a visual alarm based on the received alarm notification.

10. The method of claim 9, further comprising transmitting another alarm notification to a remote alarm device based on the received alarm notification.

11. The method of claim 10, wherein the transmitting the another alarm notification includes wirelessly transmitting the another alarm notification to the remote alarm device based on the received alarm notification.

12. An apparatus, comprising:
- a communication unit configured to receive, via a wireless networked connection from a remote device including an accelerometer that is configured to be installed in a subterranean position within a structure, an alarm notification indicating that each of a plurality of magnitudes of a longitudinal wave of a seismic movement has been determined by the remote device to exceed a particular threshold for longitudinal waves; and
- an alarm unit that is configured to be installed in the structure and configured to provide at least one of an auditory alarm and a visual alarm based on the received alarm notification.

13. The apparatus of claim 12, wherein the communication unit is further configured to transmit another alarm notification to a remote alarm device based on the received alarm notification.

14. The apparatus of claim 12, wherein the communication unit is further configured to wirelessly transmit another alarm notification to a remote alarm device based on the received alarm notification.

* * * * *

UNITED STATES PATENT AND TRADEMARK OFFICE
CERTIFICATE OF CORRECTION

| | | |
|---|---|---|
| PATENT NO. | : 8,686,850 B2 | Page 1 of 1 |
| APPLICATION NO. | : 12/707496 | |
| DATED | : April 1, 2014 | |
| INVENTOR(S) | : Zeng et al. | |

It is certified that error appears in the above-identified patent and that said Letters Patent is hereby corrected as shown below:

In the Specification

Column 5, Line 63, delete "devices 104" and insert -- devices 102 --, therefor.

Column 6, Line 55, delete "more that" and insert -- more than --, therefor.

Column 6, Line 63, delete "more that" and insert -- more than --, therefor.

Column 8, Line 2, delete "and or" and insert -- and/or --, therefor.

Signed and Sealed this
Sixteenth Day of December, 2014

Michelle K. Lee
*Deputy Director of the United States Patent and Trademark Office*